United States Patent
You et al.

(10) Patent No.: US 10,797,825 B2
(45) Date of Patent: Oct. 6, 2020

(54) DATA TRANSMISSION METHOD AND APPARATUS, AND DATA RECEPTION METHOD AND APPARATUS

(71) Applicant: LG ELECTRONICS INC., Seoul (KR)

(72) Inventors: Hyangsun You, Seoul (KR); Kijun Kim, Seoul (KR); Bonghoe Kim, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/310,391

(22) PCT Filed: Jun. 19, 2017

(86) PCT No.: PCT/KR2017/006372
§ 371 (c)(1),
(2) Date: Dec. 14, 2018

(87) PCT Pub. No.: WO2017/217827
PCT Pub. Date: Dec. 21, 2017

(65) Prior Publication Data
US 2019/0190654 A1    Jun. 20, 2019

Related U.S. Application Data

(60) Provisional application No. 62/351,309, filed on Jun. 17, 2016.

(51) Int. Cl.
*H04L 1/00*     (2006.01)
*H04B 7/00*     (2006.01)
*H04L 5/00*     (2006.01)

(52) U.S. Cl.
CPC ............ *H04L 1/0058* (2013.01); *H04B 7/00* (2013.01); *H04L 1/00* (2013.01); *H04L 1/0063* (2013.01); *H04L 5/0005* (2013.01); *H04L 5/0007* (2013.01)

(58) Field of Classification Search
CPC ........... H04L 1/0057; H03M 13/2957; H03M 13/116; H03M 13/6362
See application file for complete search history.

(56) References Cited

U.S. PATENT DOCUMENTS 8,910,025 B2 * 12/2014 Pisek ................ H03M 13/1154
    714/776
2006/0195752 A1   8/2006 Walker et al.
(Continued)

OTHER PUBLICATIONS

PCT International Application No. PCT/KR2017/006372, Written Opinion of the International Searching Authority dated Sep. 27, 2017, 29 pages.

*Primary Examiner* — Chandrahas B Patel
(74) *Attorney, Agent, or Firm* — Lee, Hong, Degerman, Kang & Waimey

(57) ABSTRACT

The transmission apparatus maps a plurality of code blocks obtained from data to a time-frequency resource, and transmits the plurality of code blocks therefrom. The time-frequency resource comprises L number of time symbols in the time domain, where L is an integer greater than 1. Each of the L number of time symbols comprises one or more different code blocks from among the plurality of code blocks. The plurality of code blocks is mapped in the time-frequency resource so that one complete code block is one time symbol.

16 Claims, 11 Drawing Sheets

(56) References Cited

U.S. PATENT DOCUMENTS

| | | |
|---|---|---|
| 2008/0151805 A1 | 6/2008 | Vayanos et al. |
| 2010/0172279 A1 | 7/2010 | Chen et al. |
| 2011/0069671 A1 | 3/2011 | Nakao et al. |
| 2016/0173232 A1 | 6/2016 | Mallik et al. |

* cited by examiner

DATA TRANSMISSION METHOD AND APPARATUS, AND DATA RECEPTION METHOD AND APPARATUS

CROSS-REFERENCE TO RELATED APPLICATIONS

This application is the National Stage filing under 35 U.S.C. 371 of International Application No. PCT/KR2017/006372, filed on Jun. 19, 2017, which claims the benefit of U.S. Provisional Application No. 62/351,309, filed on Jun. 17, 2016, the contents of which are all hereby incorporated by reference herein in their entirety.

TECHNICAL FIELD

The present invention relates to a wireless communication system and, more particularly, to a method for transmitting or receiving data and an apparatus therefor.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services at any time and anywhere by connecting a plurality of devices and objects to each other is one main issue to be considered in next generation communication.

Further, a communication system to be designed in consideration of a service/UE sensitive to reliability and standby time is under discussion. Introduction of next generation radio access technology has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

In addition, a signal transmission/reception method is required in the system supporting new radio access technologies (NR).

Also, a channel coding scheme and/or data mapping scheme suitable for NR system is required.

The technical objects that can be achieved through the present invention are not limited to what has been particularly described hereinabove and other technical objects not described herein will be more clearly understood by persons skilled in the art from the following detailed description.

Technical Solution

In one aspect of the present invention, a method for transmitting data by a transmitting device is provided. The method comprises: mapping a plurality of code blocks obtained from the data into a time-frequency resource; and transmitting the plurality of code blocks on the time-frequency resource. The time-frequency resource includes L time symbols in a time domain, where L is an integer greater than 1. Each of the L time symbols includes one or more different code blocks among the plurality of code blocks. Corresponding code block data of each of the plurality of code blocks may all be mapped into one time symbol. That is, each of the plurality of code blocks may be mapped into the time-frequency resource such that one complete code block exists within one time symbol.

In another aspect of the present invention, a transmitting device for transmitting data is provided. The transmitting device comprises a radio frequency (RF) unit; and a processor configured to control the RF unit. The processor is configured to: map a plurality of code blocks obtained from the data into a time-frequency resource, and control the RF unit to transmit the plurality of code blocks from the time-frequency resource. The time-frequency resource includes L time symbols in a time domain, where L is an integer greater than 1. Each of the L time symbols may include one or more different code blocks among the plurality of code blocks. Corresponding code block data of each of the plurality of code blocks may all be mapped into one time symbol. That is, the processor may map each of the plurality of code blocks into the time-frequency resource such that one complete code block exists within one time symbol.

In still another aspect of the present invention, a method for receiving data by a receiving device is provided. The method comprises: receiving a plurality of code blocks mapped in a time-frequency resource allocated to the data; and recovering the data from the plurality of code blocks. The time-frequency resource includes L time symbols in a time domain, where L is an integer greater than 1. Each of the L time symbols may include one or more different code blocks among the plurality of code blocks. Corresponding code block data of each of the plurality of code blocks are all received in one time symbol. That is, the receiving device may assume that one complete code block for each of the plurality of code blocks is received within one time symbol.

In further still another aspect of the present invention, a receiving device for receiving data is provided. The receiving device comprises a radio frequency (RF) unit; and a processor configured to control the RF unit. The processor is configured to: control the RF unit to receive a plurality of code blocks mapped in a time-frequency resource allocated to the data, and recovers the data from the plurality of code blocks. The time-frequency resource includes L time symbols in a time domain, where L is an integer greater than 1. Each of the L time symbols may include one or more different code blocks among the plurality of code blocks, and corresponding code block data of each of the plurality of code blocks may all be received in one time symbol. That is, the processor may assume that one complete code block for each of the plurality of code blocks is received within one time symbol.

In each aspect of the present invention, the data may be eMBB data.

In each aspect of the present invention, the transmitting device may generate N systematic code blocks by segmenting a transport block of the data, where N is an integer greater than 1, and generate N+K code blocks by performing first encoding for generating one or more parity code blocks and second encoding for adding parity bits per code block for the N systematic code blocks. In this case, K is the number of parity code blocks, and the plurality of code blocks may correspond to N+K code blocks one to one.

In each aspect of the present invention, the transmitting device may generate N parity added code blocks by performing the second encoding for each of the N systematic code blocks, and generate K parity code blocks by performing the first encoding for the N parity added code blocks. The plurality of code blocks may correspond to N+K code blocks, which correspond to a sum of the N parity added code blocks and the K parity code blocks, one to one.

In each aspect of the present invention, the transmitting device may perform the first encoding using an erasure code defined in accordance with a size of L.

In each aspect of the present invention, the transmitting device may segment the transport block into N=L−K systematic code blocks, and respectively map the N+K code blocks into the L time symbols.

In each aspect of the present invention, the receiving device may acquire N systematic code blocks by performing first decoding for recovering code blocks using parity code blocks and second decoding for recovering code blocks using parity bits per code block for N+K parity added code blocks corresponding to the plurality of code blocks, and acquire a transport block of the data from the N systematic code blocks. In this case, K is the number of parity code blocks.

In each aspect of the present invention, the receiving device may perform the second decoding for acquiring N+K parity removal code blocks using parity bits of each of the N+K parity added code blocks, and may perform the first decoding for acquiring the N systematic code blocks using K parity code blocks among the N+K parity removal code blocks.

In each aspect of the present invention, the receiving device may perform the second decoding using an erasure code defined in accordance with a size of L.

In each aspect of the present invention, the receiving device may respectively receive the N+K parity added code blocks (N=L−K) from the L time symbols.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, uplink/downlink signals can be efficiently transmitted/received. Therefore, overall throughput of a radio communication system can be improved.

According to an embodiment of the present invention, delay/latency occurring during communication between a user equipment and a base station may be reduced.

In addition, owing to development of smart devices, it is possible to efficiently transmit/receive not only a small amount of data but also data which occurs infrequently.

Moreover, signals can be transmitted/received in the NR system.

According to the channel coding scheme and/or data mapping scheme of the present invention, throughput of the NR system may be improved.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Figure 1:
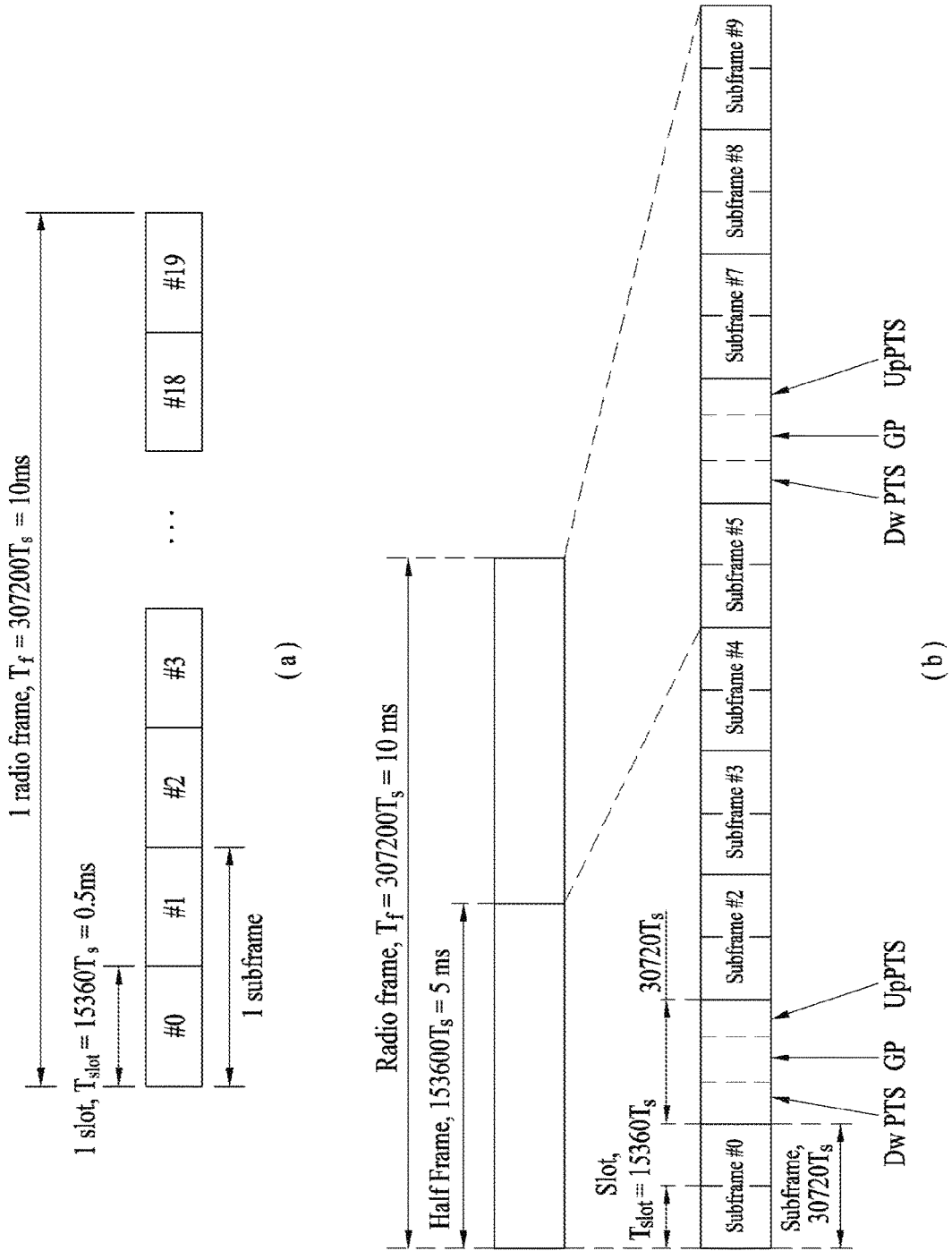
FIG. 1 illustrates the structure of a radio frame used in the LTE/LTE-A based wireless communication system.

Reference will now be made in detail to the examples of the present invention, examples of which are illustrated in the accompanying drawings. The detailed description, which will be given below with reference to the accompanying drawings, is intended to explain examples of the present invention, rather than to show the only examples that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmitting device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmitting devices always sense carrier of a network and, if the network is empty, the transmitting devices wait for determined time according to locations thereof registered in a list and then transmit data. Various methods are used to determine priority of the transmitting devices in the list and to reconfigure priority. In a system according to some versions of IEEE 802.11 standards, collision may occur and, in this case, a collision sensing procedure is performed. A transmitting device using CSMA/CA avoids collision between data transmission thereof and data transmission of another transmitting device using a specific rule.

In examples of the present invention described below, the term "assume" may mean that a subject to transmit a channel transmits the channel in accordance with the corresponding "assumption". This may also mean that a subject to receive the channel receives or decodes the channel in a form conforming to the "assumption", on the assumption that the channel has been transmitted according to the "assumption".

In the present invention, puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. The eNB is a terminology used to refer to a BS that supports LTE radio access technologies, and gNB is a terminology used to refer to a BS that supports a new radio access technology network (NR). However, in the following description of the present invention, the BS is referred to as the eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.321 and 3GPP TS 36.331 may be referenced.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s$=1/(2048*15 kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A TTI refers to an interval at which data may be scheduled. For example, the transmission opportunity of a UL grant or DL grant is given every 1 ms in the current LTE/LTE-A system. The UL/DL grant opportunity is not given several times within a time shorter than 1 ms. Accordingly, the TTI is 1 ms in the current LTE-LTE-A system.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Figure 2:
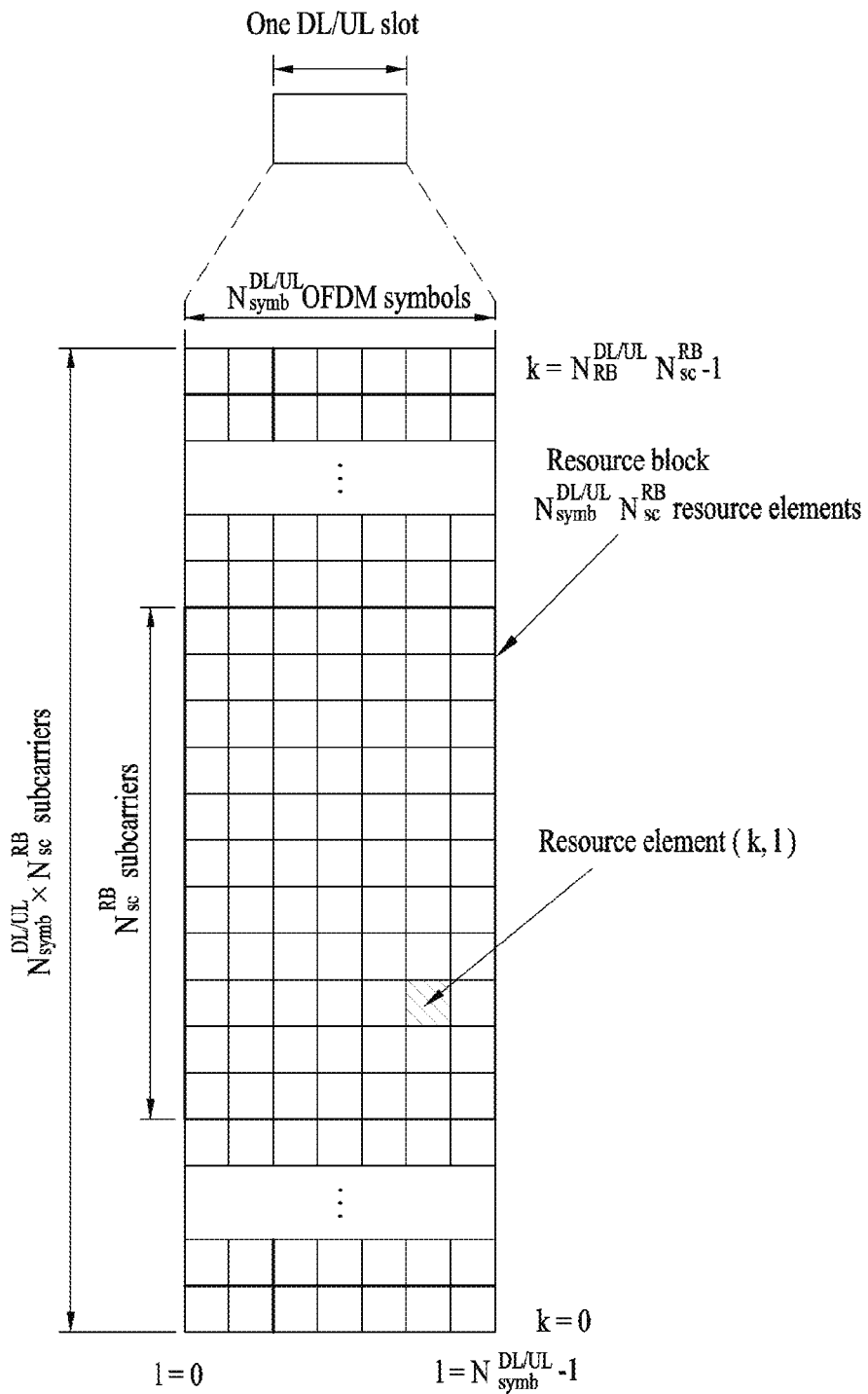
FIG. 2 illustrates the structure of a downlink (DL)/uplink (UL) slot in the LTE/LTE-A based wireless communication system.

FIG. 2 illustrates the structure of a DL/UL slot structure in the LTE/LTE-A based wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, examples of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

Figure 3:
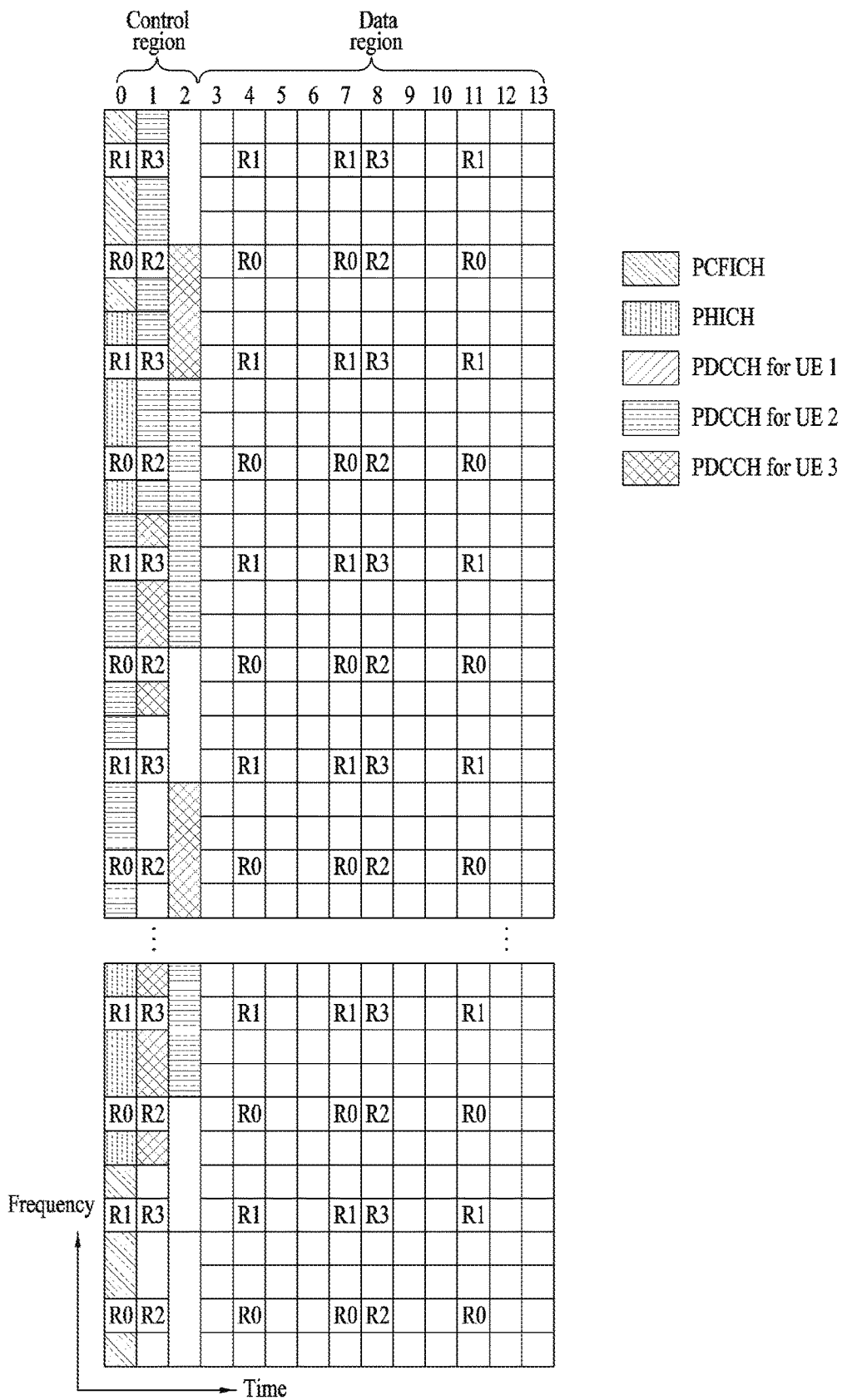
FIG. 3 illustrates the structure of a DL subframe used in the LTE/LTE-A based wireless communication system.

FIG. 3 illustrates the structure of a DL subframe used in the LTE/LTE-A based wireless communication system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PC-FICH), a physical downlink control channel (PDCCH), a physical hybrid ARQ indicator channel (PHICH), etc.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

A plurality of PDCCHs may be transmitted in a control region. A UE may monitor the plural PDCCHs. An eNB determines a DCI format according to DCI which is to be transmitted to the UE and attaches a cyclic redundancy check (CRC) to the DCI. The CRC is masked (or scrambled) with an identifier (e.g. a radio network temporary identifier (RNTI)) according to an owner or a usage of a PDCCH. For example, if the PDCCH is dedicated to a specific UE, the CRC may be masked with an identifier (e.g. a cell-RNTI (C-RNTI)) of the UE. If the PDCCH is used for a paging message, the CRC may be masked with a paging identifier (e.g. a paging-RNTI (P-RNTI)). If the PDCCH is used for system information (more specifically, a system information block (SIB)), the CRC may be masked with a system information RNTI (SI-RNTI). If the PDCCH is used for a random access response, the CRC may be masked with a random access-RNTI (RA-RNTI). CRC masking (or scrambling) includes, for example, XOR operation between the CRC and the RNTI at a bit level.

Generally, a DCI format, which may be transmitted to the UE, may differ according to a transmission mode (TM) configured for the UE. In other words, for the UE configured with a specific TM, only certain DCI format(s) corresponding to the specific TM rather than all DCI formats may be used.

A PDCCH is allocated to first m OFDM symbol(s) in a subframe, where m is an integer equal to or greater than 1 and is indicated by a PCFICH.

The PCFICH carries information about the number of OFDM symbols that DCI carried by the PDCCH spans. The PCFICH is transmitted on the first OFDM symbol of a subframe and carries information about the number of OFDM symbols used for transmission of control channels in the subframe. The PCFICH informs the UE of the number of OFDM symbols used in a corresponding subframe in every subframe. The PCFICH is located on the first OFDM symbol. The PCFICH is configured by 4 resource element groups (REGs) and each REG is distributed in the control region based on a cell ID. One REG consists of 4 REs.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, each CCE includes nine REGs, and the nine REGs are distributed over first one/two/three OFDM symbols (or four OFDM symbols if necessary for 1.4 MHz) and over the system bandwidth in order to mitigate interference for the purpose of diversity. One REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

CCEs available for PDCCH transmission in a system may be numbered from 0 to $N_{CCE}-1$, wherein $N_{CCE}=\text{floor}(N_{REG}/9)$ and $N_{REG}$ denotes the number of REGs which are not allocated to a PCFICH or a PHICH. A PDCCH consisting of n consecutive CCEs may start only on a CCE fulfilling "i mod n=0", wherein i denotes a CCE number.

A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined in terms of SSs. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

DCI formats which should be monitored by the UE depend on a transmission mode configured per serving cell. A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined in terms of SSs. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

The number of PDCCH candidates corresponds to the maximum number of blind detections that the UE can perform. For example, the UE may attempt to perform a maximum of 6 blind detections in a USS at aggregation level 1. Since the UE cannot infinitely perform blind decoding/blind detection (BD) in a subframe, the number of BDs that the UE can perform in each subframe is defined. Referring to Table 1, the number of PDCCH candidates that the UE should monitor in UE-specific search spaces (USSs) including PDCCH candidates to carry UE-specific DCI is 6 for AL=1, 6 for AL=2, 2 for AL=4, and 2 for AL=8, thus 16 in total, and the number of PDCCH candidates that the UE should monitor in common search spaces (CSSs) including PDCCH candidates to carry common DCI is 4 for AL=4 and 2 for AL=8, thus 6 in total.

Figure 4:
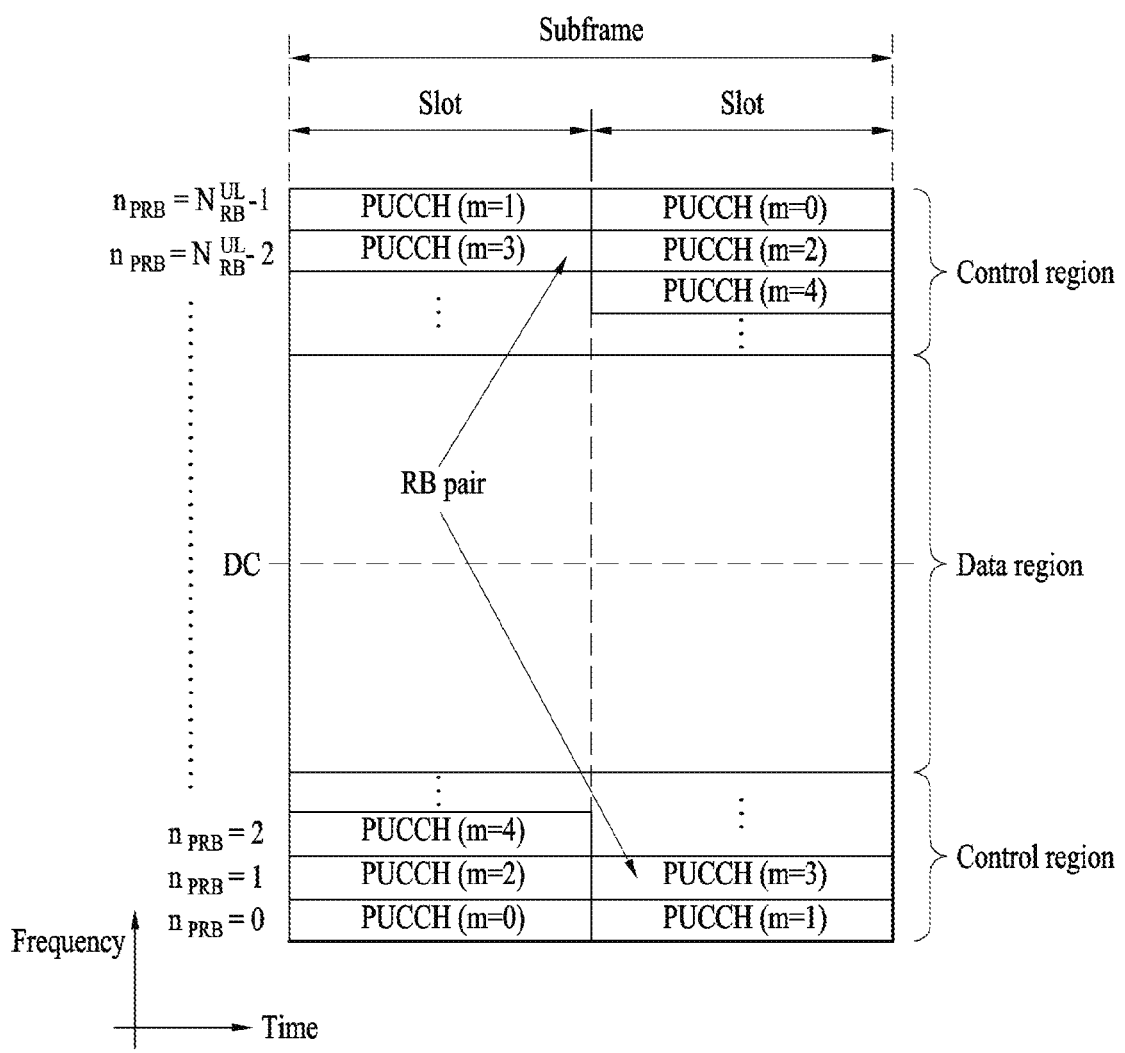
FIG. 4 illustrates the structure of a UL subframe used in the LTE/LTE-A based wireless communication system.

FIG. 4 illustrates the structure of a UL subframe used in the LTE/LTE-A based wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_o$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and/or the PDSCH may be transmitted to the MTC UE having the coverage issue through multiple (e.g., about 100) subframes.

The examples of the present invention can be applied to not only the 3GPP LTE/LTE-A system but also a new radio access technology (RAT) system. As a number of communication devices have required much higher communication capacity, the necessity of mobile broadband communication, which is much enhanced compared to the conventional RAT, has increased. In addition, massive MTC capable of providing various services anytime and anywhere by connecting a number of devices or things to each other has been considered as a main issue in the next generation communication system. Moreover, the design of a communication system capable of supporting services/UEs sensitive to reliability and latency has also been discussed. That is, the introduction of the next generation RAT considering the enhanced mobile broadband communication, massive MTC, Ultra-reliable and low latency communication (URLLC), etc. has been discussed. For convenience of description, the corresponding technology is simply referred to as a new RAT in this specification.

In the next system of LTE-A, a method to reduce latency of data transmission is considered. Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Better latency than previous generations of 3GPP RATs was one performance metric that guided the design of LTE. LTE is also now recognized by the end-users to be a system that provides faster access to internet and lower data latencies than previous generations of mobile radio technologies.

However, with respect to further improvements specifically targeting the delays in the system little has been done. Packet data latency is important not only for the perceived responsiveness of the system; it is also a parameter that indirectly influences the throughput. HTTP/TCP is the dominating application and transport layer protocol suite used on the internet today. According to HTTP Archive (http://httparchive.org/trends.php) the typical size of HTTP-based transactions over the internet are in the range from a few 10's of Kbytes up to 1 Mbyte. In this size range, the TCP slow start period is a significant part of the total transport period of the packet stream. During TCP slow start the performance is latency limited. Hence, improved latency can rather easily be shown to improve the average throughput, for this type of TCP-based data transactions. In addition, to achieve really high bit rates (in the range of Gbps), UE L2 buffers need to be dimensioned correspondingly. The longer the round trip time (RTT) is, the bigger the buffers need to be. The only way to reduce buffering requirements in the UE and eNB side is to reduce latency.

Radio resource efficiency could also be positively impacted by latency reductions. Lower packet data latency could increase the number of transmission attempts possible within a certain delay bound; hence higher block error ration (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. VoLTE), if keeping the same BLER target. This would improve the VoLTE voice system capacity.

There are more over a number of existing applications that would be positively impacted by reduced latency in terms of increased perceived quality of experience: examples are gaming, real-time applications like VoLTE/OTT VoIP and video telephony/conferencing.

Going into the future, there will be a number of new applications that will be more and more delay critical. Examples include remote control/driving of vehicles, augmented reality applications in e.g. smart glasses, or specific machine communications requiring low latency as well as critical communications.

Figure 5:
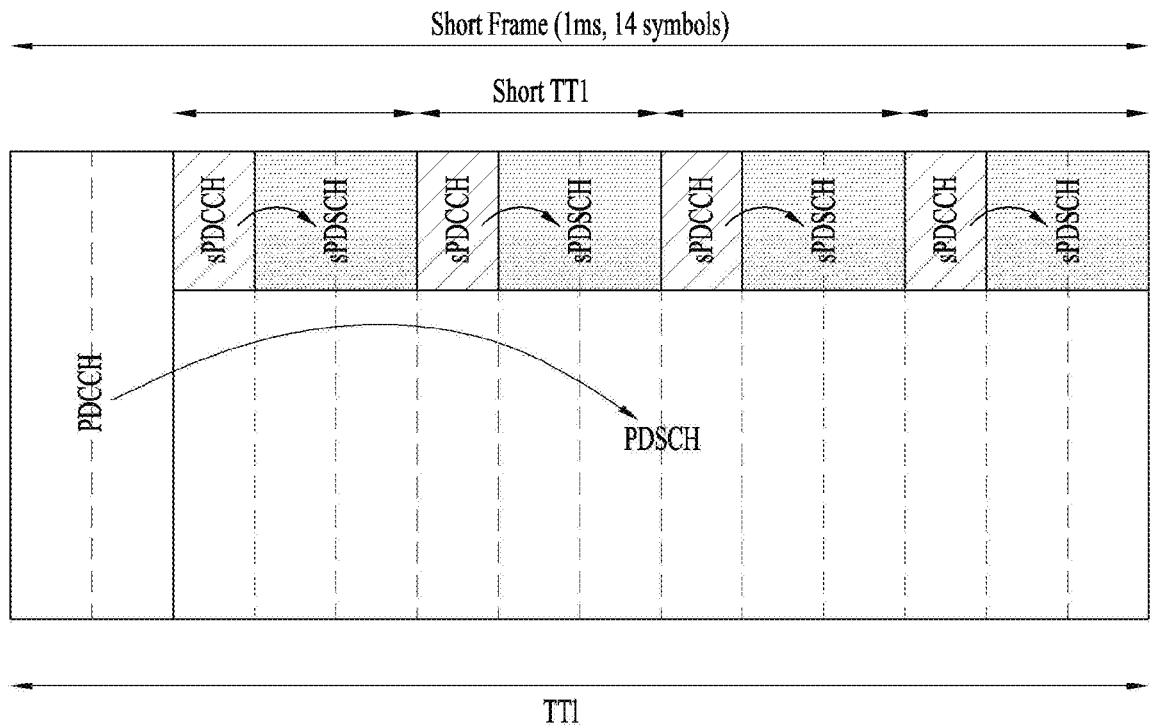
FIG. 5 illustrates an example of a short transmission time interval (TTI) and a transmission example of a control channel and a data channel in the short TTI.

FIG. 5 illustrates an example of a short TTI and a transmission example of a control channel and a data channel in the short TTI.

To reduce a user plane (U-plane) latency to 1 ms, a shortened TTI (sTTI) shorter than 1 ms may be configured. For example, for the normal CP, an sTTI consisting of 2 OFDM symbols, an sTTI consisting of 4 OFDM symbols and/or an sTTI consisting of 7 OFDM symbols may be configured.

In the time domain, all OFDM symbols constituting a default TTI or the OFDM symbols except the OFDM symbols occupying the PDCCH region of the TTI may be divided into two or more sTTIs on some or all frequency resources in the frequency band of the default TTI.

In the following description, a default TTI or main TTI used in the system is referred to as a TTI or subframe, and the TTI having a shorter length than the default/main TTI of the system is referred to as an sTTI. For example, in a system in which a TTI of 1 ms is used as the default TTI as in the current LTE/LTE-A system, a TTI shorter than 1 ms may be referred to as the sTTI. The method of transmitting/receiving a signal in a TTI and an sTTI according to embodiments described below is applicable not only to the system according to the current LTE/LTE-A numerology but also to the default/main TTI and sTTI of the system according to the numerology for the new RAT environment.

In the downlink environment, a PDCCH for transmission/scheduling of data within an sTTI (i.e., sPDCCH) and a PDSCH transmitted within an sTTI (i.e., sPDSCH) may be transmitted. For example, referring to FIG. 5, a plurality of the sTTIs may be configured within one subframe, using different OFDM symbols. For example, the OFDM symbols in the subframe may be divided into one or more sTTIs in the time domain. OFDM symbols constituting an sTTI may be configured, excluding the leading OFDM symbols on which the legacy control channel is transmitted. Transmission of the sPDCCH and sPDSCH may be performed in a TDM manner within the sTTI, using different OFDM symbol regions. In an sTTI, the sPDCCH and sPDSCH may be transmitted in an FUM manner, using different regions of PRB(s)/frequency resources.

<OFDM Numerology>

The new RAT system uses an OFUM transmission scheme or a similar transmission scheme. For example, the new RAT system may follow the OFUM parameters defined in the following table. Alternatively, a numerology that uses parameters different from those of the following Table may be defined. Alternatively, the new RAT system may conform to numerology of legacy LTE/LTE-A but include a broader system bandwidth (e.g., 100 MHz). For example, the NR system or the NR cell may support a plurality of numerologies having their respective subcarrier intervals. That is, UEs operating with different numerologies may coexist in one cell.

TABLE 1

| Parameter | Value |
| --- | --- |
| Subcarrier-spacing (Δf) | 75 kHz |
| OFDM symbol length | 13.33 us |
| Cyclic Prefix(CP) length | 1.04 us/0.94 us |
| System BW | 100 MHz |
| No. of available subcarriers | 1200 |
| Subframe length | 0.2 ms |
| Number of OFDM symbol per Subframe | 14 symbols |

<Analog Beamforming>

In millimeter wave (mmW), the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5λ (wavelength). Therefore, in mmW, increasing the coverage or the throughput by increasing the beamforming (BF) gain using multiple antenna elements is taken into consideration.

If a transceiver unit (TXRU) is provided for each antenna element to enable adjustment of transmit power and phase, independent beamforming is possible for each frequency resource. However, installing TXRU in all of the about 100 antenna elements is less feasible in terms of cost. Therefore, a method of mapping a plurality of antenna elements to one TXRU and adjusting the direction of a beam using an analog phase shifter is considered. This analog beamforming method may only make one beam direction in the whole band, and thus may not perform frequency selective beamforming (BF), which is disadvantageous.

Hybrid BF with B TXRUs that are fewer than Q antenna elements as an intermediate form of digital BF and analog BF may be considered. In the case of hybrid BF, the number of directions in which beams may be transmitted at the same time is limited to B or less, which depends on the method of collection of B TXRUs and Q antenna elements.

<Subframe Structure>

Figure 6:
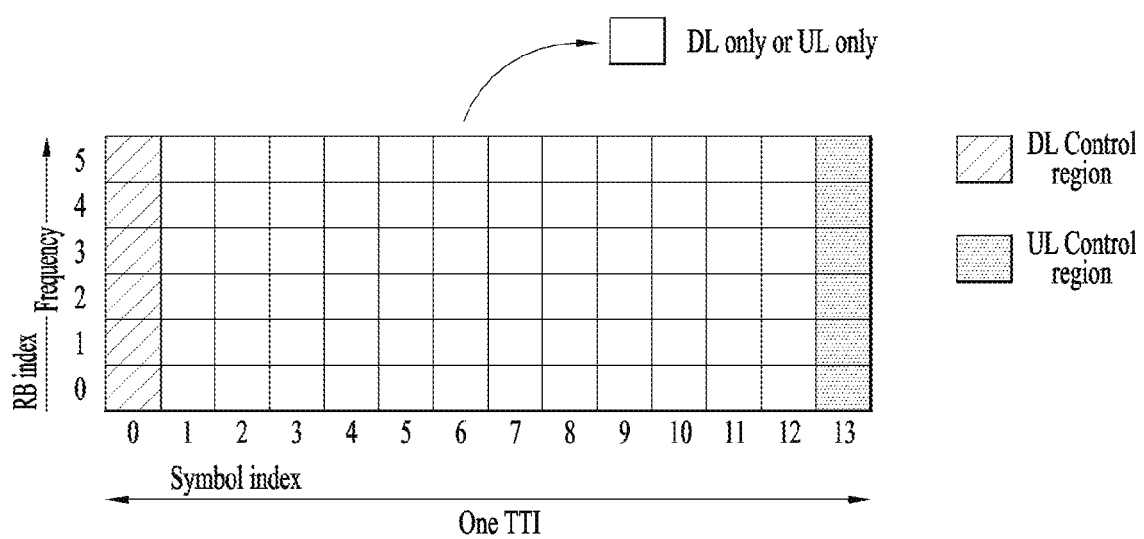
FIG. 6 illustrates a subframe structure available in a new radio access technology (NR) system.

FIG. 6 illustrates a subframe structure available in a new radio access technology (NR) system.

To minimize data transmission latency, a self-contained subframe structure in which a control channel and a data channel are time-division-multiplexed (TDMed) is considered in 5G new RAT.

In FIG. 6, the hatched area represents the transmission region of a DL control channel (e.g., PDCCH) carrying the DCI, and the black area represents the transmission region of a UL control channel (e.g., PUCCH) carrying the UCI. Here, the DCI is control information that the eNB transmits to the UE. The DCI may include information on cell configuration that the UE should know, DL specific information such as DL scheduling, and UL specific information such as UL grant. The UCI is control information that the UE transmits to the eNB. The UCI may include a HARQ ACK/NACK report on the DL data, a CSI report on the DL channel status, and a scheduling request (SR).

In FIG. 6, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the subframe structure, DL transmission and UL transmission may be sequentially performed in one subframe, and thus transmission/reception of DL data and reception/transmission of UL ACK/NACK for the DL data may be performed in one subframe. As a result, the time taken to retransmit data when a data transmission error occurs may be reduced, thereby minimizing the latency of final data transmission.

In such a subframe structure, a time gap is needed for the process of switching from the transmission mode to the reception mode or from the reception mode to the transmission mode of the eNB and UE. On behalf of the process of switching between the transmission mode and the reception mode, some OFDM symbols at the time of switching from DL to UL in the subframe structure are set as a guard period (GP).

In a legacy LTE/LTE-A system, the DL control channel is TDMed with the data channel (refer to FIG. 3) and the PDCCH, which is the control channel, is distributively transmitted throughout an entire system band. However, in the new RAT, it is expected that the bandwidth of one system reaches approximately a minimum of 100 MHz and it is difficult to distributively transmit the control channel throughout the entire band. For data transmission/reception, if the UE monitors the entire band to receive the DL control channel, this may cause increase in battery consumption of the UE and deterioration in efficiency. Accordingly, the present invention proposes a scheme of locally or distributively transmitting the DL control channel in a partial frequency band within a system band, i.e., within a channel band.

Figure 7:
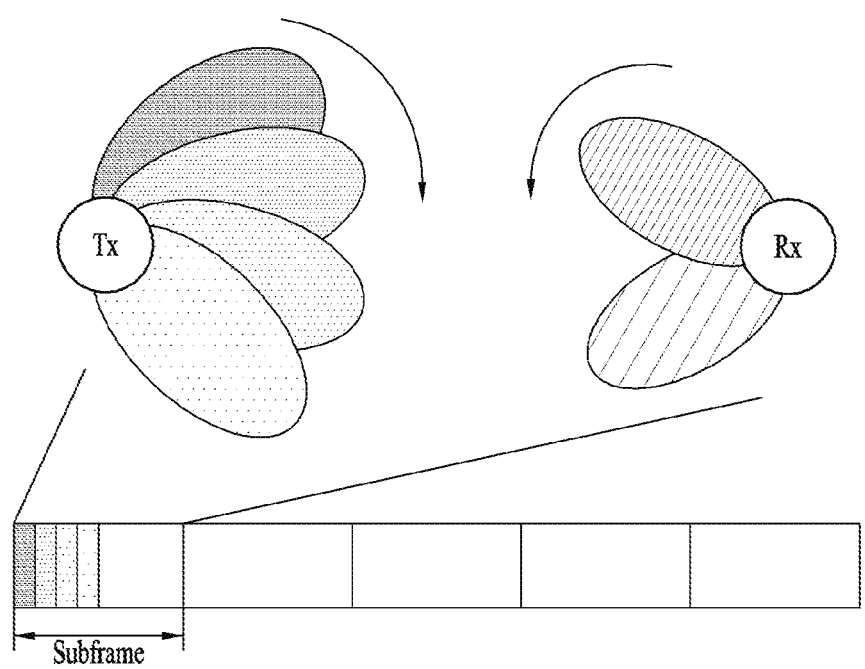
FIG. 7 illustrates an application example of analog beamforming.

FIG. 7 illustrates a transmission/reception method of a radio signal using an analog beam. Particularly, FIG. 7 illustrates a transmission/reception method of a radio signal by transmission/reception (Tx/Rx) analog beam scanning.

Referring to FIG. 7, if the eNB transmits a synchronization signal in a cell or on a carrier while switching beams, the UE performs synchronization with the cell/carrier using the synchronization signal detected in the cell/carrier and searches for a (beam) direction which is most matched therefor. Through this process, the UE should be able to acquire a cell ID and a beam ID (corresponding to the beam direction). While the UE acquires the beam ID, the UE may acquire a signal transmitted in the beam direction, particularly, RS information, for example, an RS sequence, seed information, or a location. The eNB may allocate a group ID to UEs that have acquired a specific beam ID, i.e., UEs capable of receiving a DL channel in a specific beam direction and transmit cell-common information to the UEs by being divided in time/space on a beam ID basis. The cell-common information may be transmitted to the UEs by a beam ID common scheme.

A UE that has acquired a beam ID in the cell receives cell-specific information as beam ID or group ID specific information. The beam ID or group ID specific information may be information that UEs of a corresponding group commonly receive.

In the present invention, for convenience of description, a channel via which downlink data are transmitted is referred to as a PDSCH, and a channel via which uplink data are transmitted is referred to as a PUSCH. For convenience of description, although the present invention will be described based on a downlink environment (transmission of PDSCH), the present invention may be applied to an uplink environment (transmission of PUSCH).

Figure 8:
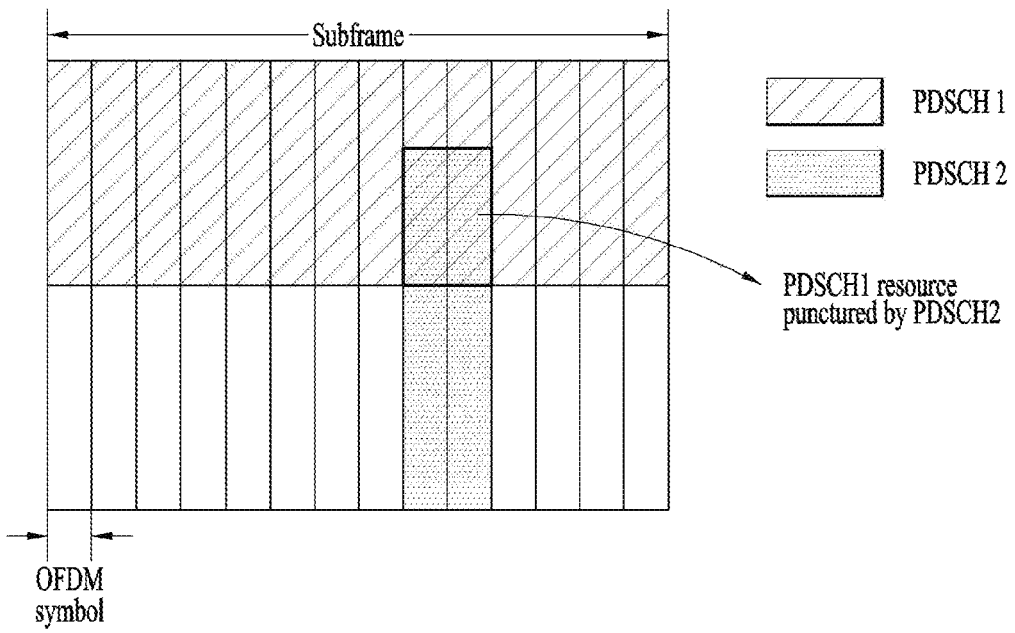
FIG. 8 illustrates that two kinds of data transmissions having their respective properties collide with each other in the same time-frequency resource.

FIG. 8 illustrates that two kinds of data transmissions having their respective properties collide with each other in the same time-frequency resource.

If data (e.g., URLLC data) in which latency is regarded as an important factor and data (e.g., eMBB data) in which latency is regarded as a relatively less important factor are multiplexed into the same frequency resource of the same cell and then transmitted, transmission of the former data may collide with transmission of the latter data in the same time-frequency resource. Since a priority is generally given to the transmission of the former data, as shown in FIG. 8, transmission may be performed in such a manner that PDSCH1 resource corresponding to the data in which latency is regarded as a less important factor is punctured by PDSCH2 corresponding to the data in which latency is regarded as an important factor. In this case, PDSCH1 corresponding to the data in which latency is less important is transmitted at a length longer than that of PDSCH2 corresponding to the data in which latency is important. Therefore, some OFDM symbol(s) region of PDSCH1 corresponding to the data in which latency is less important is punctured for transmission of PDSCH2 corresponding to the data in which latency is more important. In this case, data of which resource region is punctured experience interference in the corresponding resource, whereby great throughput deterioration is generated. Also, if a UE which decodes PDSCH1 does not know the presence of PDSCH2 which has punctured the PDSCH1 resource, since the data of the punctured resource position are decoded by being recognized as the data of PDSCH1, an error rate may be increased. Therefore, a method for improving reception throughput of data punctured for transmission of another data is required.

Figure 9:
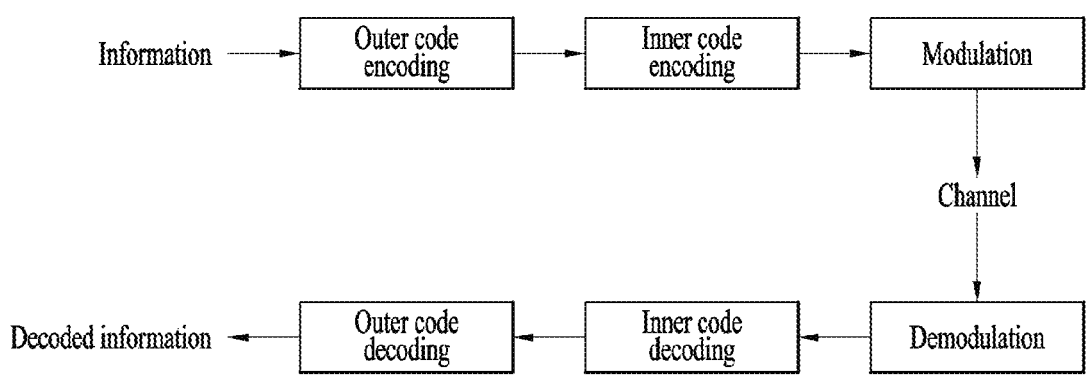
FIG. 9 illustrates a brief flow of a channel coding procedure and a channel decoding procedure.

FIG. 9 illustrates a brief flow of a channel coding procedure and a channel decoding procedure.

For the purpose of throughput improvement of channel coding and recovery of some data of which reception has been failed, as shown in FIG. 9, information to which a plurality of channel codes (generally, 2 channel codes) not one channel code are sequentially applied may be transmitted/received. At this time, of the two channel codes, a channel code located at the outer side of a transmission procedure (that is, channel code of which encoding is performed earlier in encoding order and of which decoding is performed later in decoding order) is referred to as an outer code, and a channel code located at the inner side of the transmission procedure (that is, channel code of which decoding is performed earlier in decoding order and of which encoding is performed later in encoder order) is referred to as an inner code.

Various channel codes may respectively be used as the outer code and the inner code. Generally, an erasure code such as a single parity code (SPC), a hamming code, Bose-Chaudhuri-Hocquenghem (BCH) code, or Reed Solomon (RS) code may be used as the outer code, and a convolution code, a turbo code, a low-density parity check (LDPC) code, or a polar code may be used as the inner code. In this case, the SPC means a code that obtains a parity bit of 1 bit by XOR computation (that is, d1 XOR d2 XOR . . . XOR dn) for all of information bits (that is, d1, d2, dn). Since the other channel codes are known in the field of channel coding, their description will be omitted.

Hereinafter, for convenience of description, the outer code is referred to as an outer channel code, and the inner code is referred to as an inner channel code or a channel code.

Figure 10:
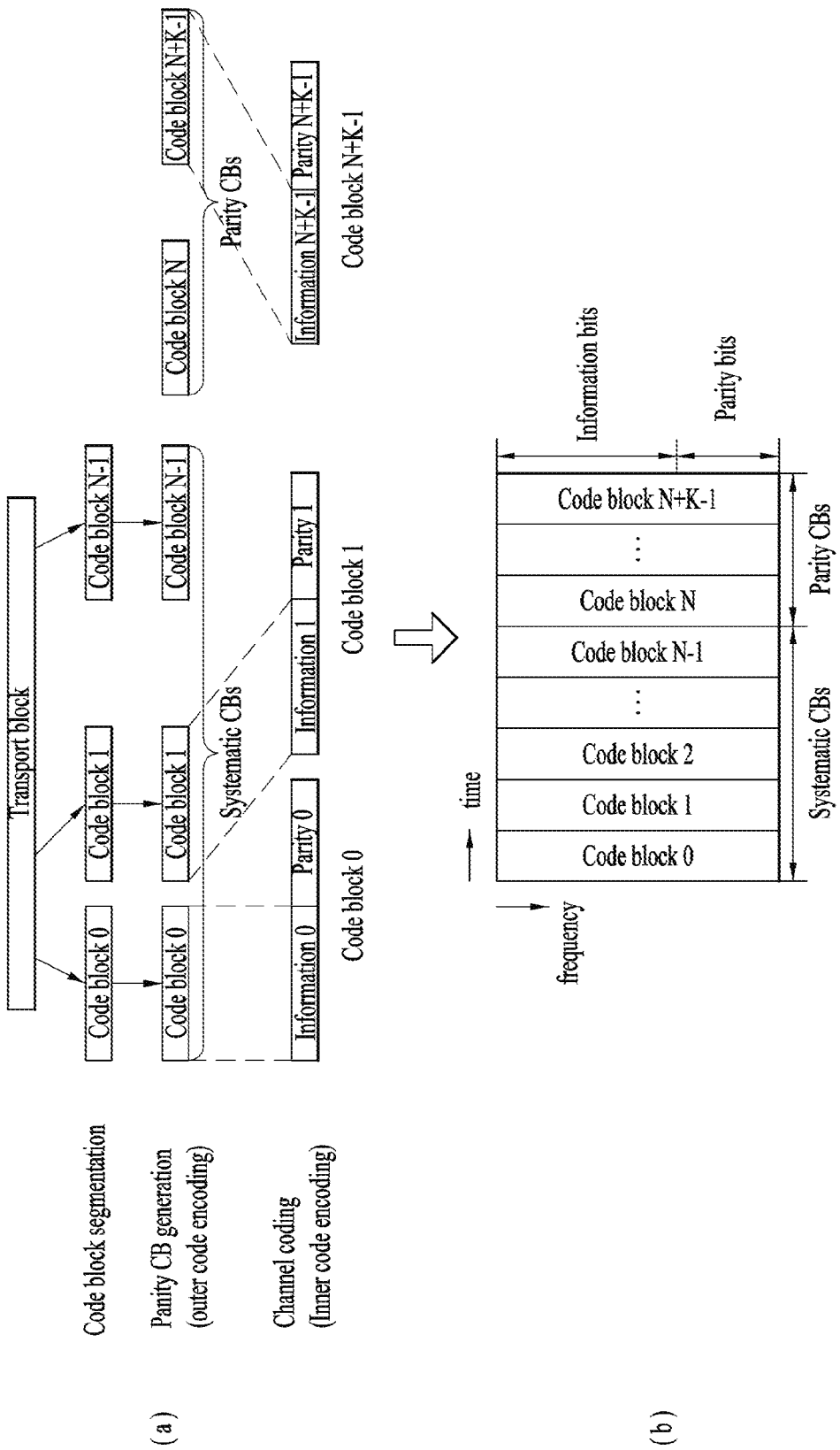
FIG. 10 illustrates a concept of outer encoding and inner encoding and data mapping according to the present invention.

FIG. 10 illustrates a concept of outer encoding and inner encoding and data mapping according to the present invention.

Meanwhile, the erasure code may be used as the outer code. Erasure code encoding makes parity code blocks (CBs) which are auxiliary blocks to be appended in CBs constituting a transport block (TB). Inner code encoding generates, from these, code blocks having parity bits added. Referring to FIG. 10(a). if TB is segmented by N CBs, the N CBs are subjected to outer code encoding, whereby K parity CBs are generated and a total of N+K CBs are input to inner code encoding. The inner code encoding generates N+K output CBs by adding parity bits to each of the total N+K CBs.

In the current LTE/LTE-A system, the CBs are mapped into OFDM symbols in accordance with a staggering scheme in such a manner that a part of one CB is partially mapped into OFDM symbol x and the remaining part of the one CB is mapped into OFDM symbol x+1. Therefore, one CB is split to be mapped into two OFDM symbols, wherein one OFDM symbol does not have a whole of one CB but has a part of the one CB, and one OFDMM symbol has at least two CBs partially mapped therein. Therefore, if CBs of data are mapped into the time-frequency resource in accordance with a mapping scheme used in the current LTE/LTE-A system, the plurality of CBs may be damaged when one OFDM symbol into which the data are mapped is punctured. To solve this problem, the present invention suggests a method for successfully receiving data in a receiving device if other data are transmitted on some resource (e.g., OFDM symbol) region on which data are transmitted in a subframe in the NR environment. The present invention will be described considering that some resource (e.g., OFDM symbol) region on which data are transmitted is punctured and other data are transmitted on the punctured resource. However, the present invention described hereinafter may be applied to even the case that the receiving device cannot receive the data on the some resource normally due to inter-cell interference. Also, the present invention may be applied to even the case that data transmitted at the legacy TTI or a longer TTI are punctured by data transmitted at a shortened TTI in the LTE/LTE-A system as well as the NR environment.

To enhance reception throughput of data of which some resource region is punctured, the following schemes may be considered in the receiving device.

Solution A) After a non-transmitted resource region due to other data of resources of corresponding data is punctured, reception and decoding of the corresponding data are performed.

Solution B) The non-transmitted data (or data failed to be successfully received) are recovered using an outer erasure code.

The present invention suggests a data mapping method for improving throughput if a scheme such as solution B is used to enhance reception throughput of data of which some resource region is punctured.

If the solution B is applied, the following transmission procedure may generally be considered as follows. As illustrated in FIG. 10, if a TB to be transmitted exists, the TB may be segmented into N CBs. The transmitting device may obtain K parity CBs by encoding the N CBs using an outer code. The transmitting device may perform channel coding (that is, inner code encoding) for each of a total N+K CBs. As a result, parity bits are added to each CB. Referring to FIG. 10(b), the N+K CBs to which parity bits are added may be mapped into a data transmission region. For example, one CB may be mapped into one OFDM symbol region, and different CBs may be mapped into different OFDM symbol regions. In this case, even though one or a plurality of CBs are not transmitted due to puncturing, if a position of CB which is not received successfully is identified, the receiving device may recover CB(s) which is (are) not received properly, through outer code decoding by using the parity CBs.

At this time, outer code encoding may be performed after channel code (that is, inner code) encoding as the case may be. That is, encoding for adding parity to each CB may first be performed, and encoding for generating K parity CBs may be performed later. However, in case of decoding, the receiving device should recover CB(s) constituting TB by first recovering CBs using parity per information block and recovering systematic CB(s) of the CBs, which are not received properly, using the parity CBs.

In order that the receiving device may determine CBs which are not received successfully, the following methods may exist.

a) The transmitting device performs cyclic redundancy check (CRC) attachment for each CP after segmenting a TB into a plurality of CBs, whereby the receiving device may determine whether each CB has been successfully decoded (or received) after channel code decoding (that is, inner code decoding).

b) The receiving device may previously know a position (e.g., OFDM symbol position and position (index) of CB) of a resource greatly affected by interference due to other data, or may be configured, by the transmitting device, a position (e.g., OFDM symbol position and position (index) of CB) of a resource in which transmission of corresponding data is punctured or which is greatly affected by interference due to transmission of other data.

The present invention may be applied to even the case that the transmitting device transmits only systematic CB without transmitting parity CB when transmitting data. In the aforementioned description of the present invention, a value of K may be 0.

<A. Unit of Outer Coding>

In this section, an application unit of an outer code during a procedure of generating K parity CBs using an outer code from N CBs is suggested.

Figure 11:
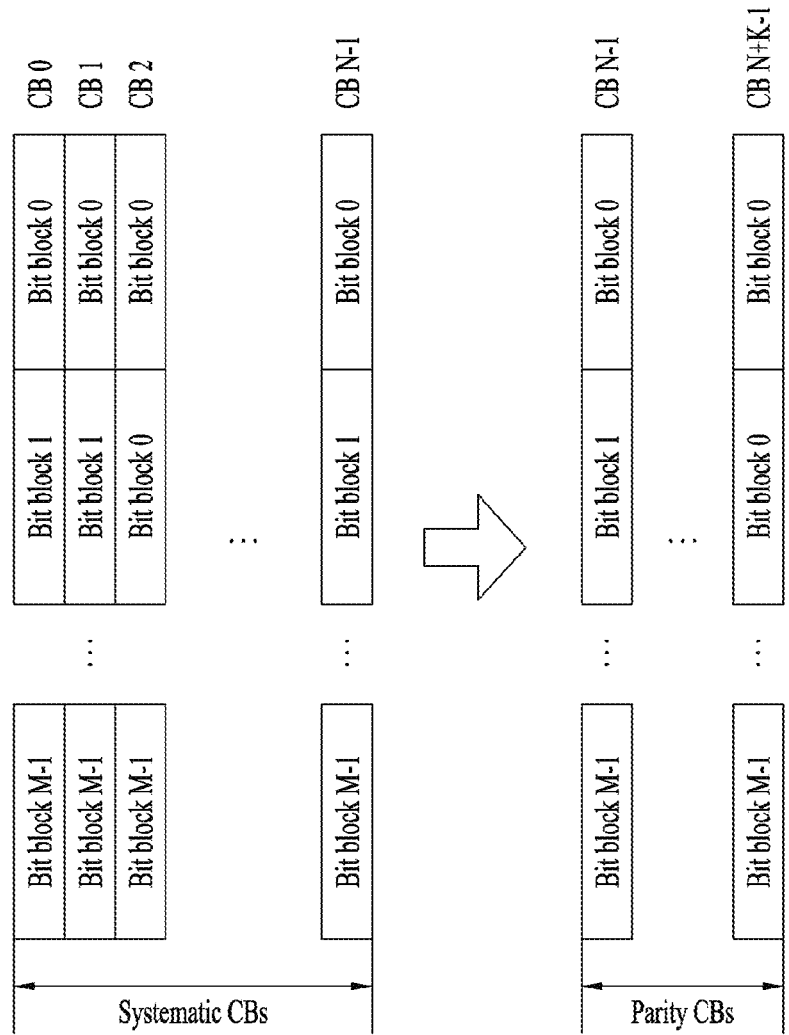
FIG. 11 illustrates an application unit of an outer code according to the present invention.

FIG. 11 illustrates an application unit of an outer code according to the present invention.

If an application bit unit of an outer code is referred to as a bit block, as shown in FIG. 11, one CB may be categorized into a plurality of bit blocks (hereinafter, M bit blocks). At this time, the transmitting device obtains K parity bit blocks by performing outer code encoding for each of a total number of N bit blocks in each of N CBs. The respective parity bit blocks are included in their respective parity code blocks different from each other. For example, the transmitting device obtains m-th bit blocks of K parity CBs, that is, K parity bit blocks by performing outer code encoding for m-th bit blocks of N CBs, that is, a total number of N bit blocks. Therefore, an outer code encoding procedure of total M times is generally performed to obtain K parity CBs from N CBs.

At this time, the number of information bits constituting one bit block may be as follows.

-Single Bit

* One bit may configure one bit block. In this case, K outer code parity bits may be generated using a total number of N bits including one bit from each CB, and each of K parity bits may belong to one bit, whereby the K parity bits may belong to a total number of K parity CBs.

-A Plurality of Bits

* A plurality of bits may configure one bit block. In this case, K*b outer code parity bits may be generated using a total number of N*b bits including b bits from each CB, and each of K*b parity bits may belong to b bits, whereby the K*b parity bits may belong to a total number of K parity CBs.

* A plurality of bits (e.g., a bits) may configure one non-binary value having a size of $2^a$ (that is, one value from 0 to $2^a-1$). In this case, K outer code parity non-binary values may be generated using a total number of N non-binary values including one non-binary value (that is, a bits) from each CB. Each of K parity non-binary values may belong to one non-binary value, whereby the K parity non-binary values may belong to a total number of K parity CBs.

* A plurality of bits (e.g., a bits) may configure one non-binary value having a size of $2^a$ (that is, one value from 0 to $2^a-1$). In this case, K*b outer code parity non-binary values may be generated using a total number of N*b non-binary values including b non-binary values (that is, a total of a*b bits) from each CB. Each of K*b parity non-binary values may belong to b non-binary values, whereby the K*b parity non-binary values may belong to a total number of K parity CBs.

<B. Code Block to OFDM Symbol Mapping>

In this section, detailed methods for mapping N+K CBs subjected to outer channel encoding and inner channel encoding into a resource region on which data are transmitted will be suggested.

Figure 12:
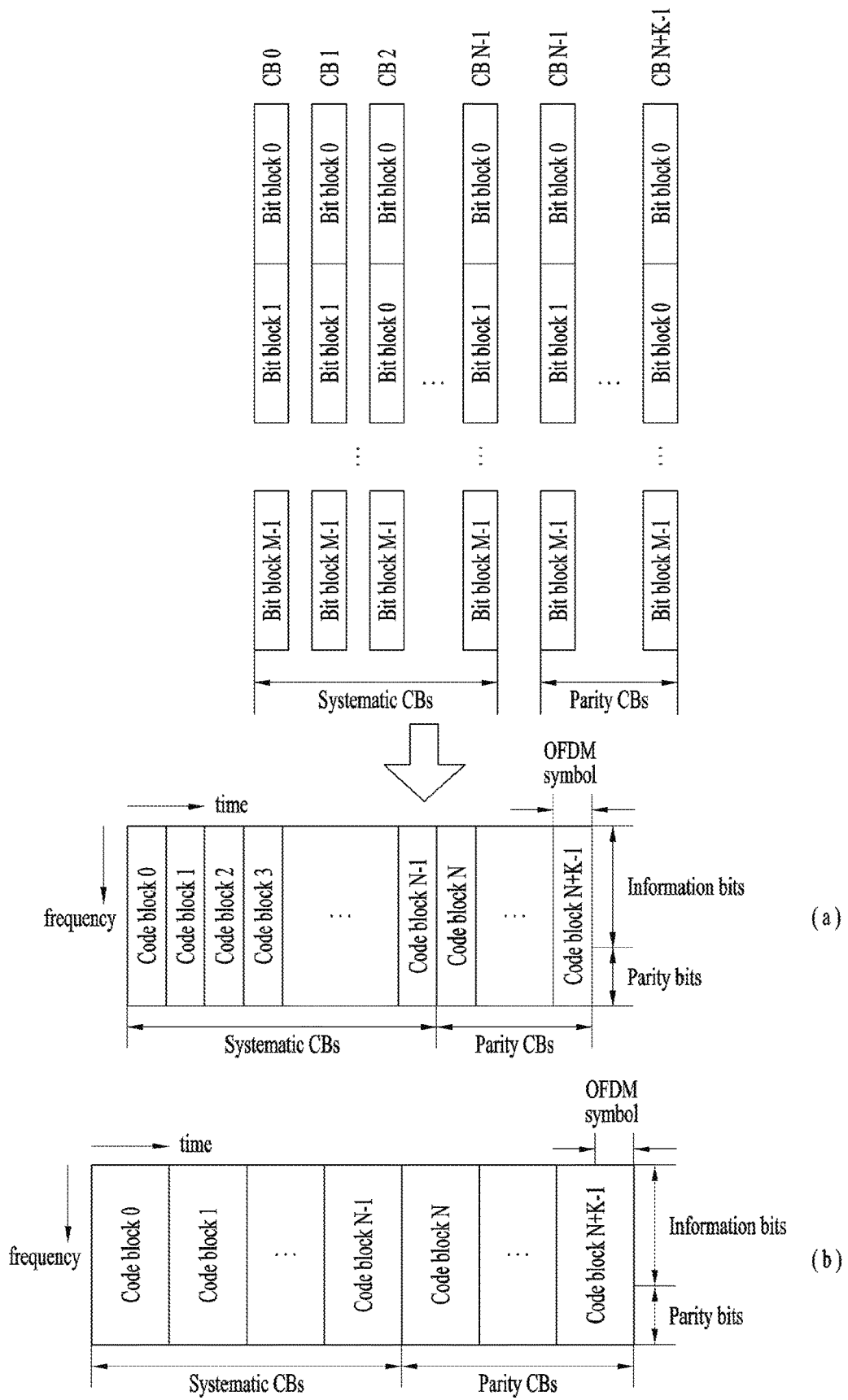
FIG. 12 illustrates a method for mapping code blocks into time symbol(s) in accordance with the present invention.

FIG. 12 illustrates a method for mapping code blocks into time symbol(s) in accordance with the present invention.

First of all, methods for mapping each CB into an OFDM symbol region on which data are transmitted will be described.

* Method 1) One CB may be mapped into one OFDM symbol. In more detail, one CB may be mapped into one OFDM symbol region only. Therefore, as illustrated in an example of FIG. 12(a), N+K CBs may respectively be mapped into a total number of N+K OFDM symbols.

Alternatively, although one CB is mapped into one OFDM symbol, the same CB may be mapped into different OFDM symbols. In this case, for example, each CB may be rate-matched after being (inner code) encoded to be matched with the amount of a data transmission resource existing in one OFDM symbol region. That is, in the method 1), the number of CBs may be determined to be matched with the amount of resources, for example, the number of transmission OFDM symbols. For example, if the number of OFDM symbols used for PDSCH transmission is 10, in the method 1, the number of CBs to be generated by segmentation of a transport block and a CB size may be determined such that the number N+K of CBs to be mapped into the OFDM symbol(s) region may be 10. Each CB is rate-matched after being encoded with a mother code rate by an inner code. Unlike the legacy LTE/LTE-A system, the CBs are not partially mapped into one OFDM symbol but fully mapped into one OFDM symbol. Therefore, it may be assumed that the UE may obtain a whole bit sequence constituting a specific CB from one OFDM symbol. Also, since one CB is mapped into one OFDM symbol, if some OFDM symbol of data is punctured, the specific CB mapped into the corresponding OFDM symbol is damaged, whereby the receiving device may recover the specific CB only or request retransmission for the specific CB.

* Method 2) One CB may be mapped into a region of a plurality of consecutive or non-consecutive OFDM symbols. This may be considered for the case that a size of information bits constituting each CB is greater than the amount of a resource region included in one OFDM symbol. If one CB is mapped into L OFDM symbols, one CB may also be mapped into L consecutive or non-consecutive OFDM symbols. Therefore, as illustrated in the example of FIG. 12(b), N+K CBs may respectively be mapped into a region of a total of L*(N+K) OFDM symbols. Alternatively, although one CB is mapped into an OFDM symbol group configured by L OFDM symbols, the same CB may be mapped into a plurality of different OFDM symbol groups. In this case, for example, each CB may be rate-matched after being (inner code) encoded to be matched with the amount of a data transmission resource existing in a region of L OFDM symbols. In other words, the number and size of CB s obtained by CB segmentation of a transport block which will be transmitted may be determined based on the number of transmission OFDM symbols, and N+K CB s may be encoded with a mother code rate and mapped into a data RE after being rate-matched to be matched with the amount of a data transmission resource into which the N+K CBs will be mapped.

* Method 3) A plurality of CBs (e.g., A CBs) may be mapped into one OFDM symbol. In more detail, a plurality of CBs (e.g., A CBs) may be mapped into one OFDM symbol, and one CB may be mapped into one OFDM symbol only. Therefore, N+K CBs may be mapped into a region of a total number of N+K/A OFDM symbol(s). Alternatively, although a plurality of CBs (e.g., A CBs) are mapped into one OFDM symbol, the same CB may be mapped into different OFDM symbols. In this case, for example, each CB may be rate-matched after being (inner code) encoded to be matched with the amount of a resource obtained by dividing the amount of a data transmission resource existing in one OFDM symbol region by A. In other words, the number and size of CBs obtained by CB segmentation of a transport block which will be transmitted may be determined based on the number of transmission OFDM symbols, and N+K CBs may be encoded with a mother code rate and mapped into a data RE after being rate-matched to be matched with the amount of a data transmission resource into which the N+K CBs will be mapped. Unlike the legacy LTE/LTE-A system, the CBs are not partially mapped into one OFDM symbol but fully mapped into one OFDM symbol. Therefore, it may be assumed that the UE may obtain a whole bit sequence constituting a specific CB from one OFDM symbol. For reference, the method 3 may be extended to the case that A is 1. In this case, the method 1 belongs to one type of the method 3.

* Method 4) N+K CBs are concatenated in due order, and the concatenated CBs may be mapped in a data transmission resource region in the order of frequency first, time second. In this case, for example, each CB may be rate-matched after being (inner code) encoded to be matched with a value of obtained by dividing the amount of total resources to which data may be transmitted by (N+K). In other words, the number and size of CBs obtained by CB segmentation of a transport block which will be transmitted may be determined based on the number of transmission OFDM symbols, and N+K CBs may be encoded with a mother code rate and mapped into a data RE after being rate-matched to be matched with the amount of a data transmission resource into which the N+K CBs will be mapped.

When one CB is mapped into one or a plurality of OFDM symbol(s), if a region of the one or the plurality of OFDM symbol(s) is referred to as one OFDM symbol group, the OFDM symbol group may be identified by a boundary of a TTI shorter than that of data which are currently transmitted. For example, when a TTI for eMBB and a TTI for URLLC exist, a size of an OFDM symbol group for eMBB may be equal to an OFDM symbol length of a TTI for URLLC, and/or a boundary of the OFDM symbol group for eMBB may be equal to a boundary of the TTI for URLLC. That is, a region of OFDM symbol(s) which belong to the same short TTI may belong to the same OFDM symbol group. If a plurality of TTIs shorter than the TTI of the data which are currently transmitted exist, the OFDM symbol group may be divided 1) based on a boundary of the shortest TTI or 2) based on a boundary of the longest TTI among TTIs shorter than TTI in which data are transmitted.

Considering that data are transmitted in the same manner as the method 1, if data are transmitted in L OFDM symbol(s), the transmitting device may transmit transmission data (that is, transport block) having a size of D by dividing the transmission data into L−K CBs. That is, when CB segmentation is performed for a TB, the number N of segmented CBs may be equal to L−K. K parity CBs may be generated from N systematic CBs, whereby systematic CBs and parity CBs may be transmitted through L=N+K OFDM symbols. In this case, a size of a bit constituting one CB is equal to D/N=D/(L−K). Coding performance is affected by a CB size (hereinafter, CBsize), wherein the greater CBsize is, the better coding performance is, but coding complexity is increased. Meanwhile, a boundary may exist in a bit size constituting one CB. That is, a size of each CB may be required to be CBsize_min or more and CBsize_max or less. A minimum value CBsize_min of the CB sizes which may be used and a maximum value CBsize_max of the CB sizes which may be used are determined differently in accordance with a coding scheme. For example, in an LTE turbo code used in the LTE/LTE-A system, CBsize_min is 40 bits, and CBsize_max is 6144 bits. In codes which will be used in the NR system, separate CBsize_min and CBsize_max may be determined. CB may be segmented as follows in accordance with a size of D/N=D/(L−K), and CB to OFDM symbol mapping may be performed.

* If D/(L−K) has a value of CBsize_min or more and CBsize_max or less, data may be transmitted in the same manner as the method 1. That is, one CB may be mapped into one OFDM symbol, one TB may be segmented into (L−K) systematic CBs, K parity CBs may be generated, and CBs may be mapped into L OFDM symbols one by one. At this time, a size of each CB may be equal to D/(L−K).

* If D/(L−K) is smaller than CBsize_min, data may be transmitted in the same manner as the method 2. That is, one CB may be mapped into P>1 OFDM symbols. At this time, one TB may be segmented into (L−K)/P systematic CBs, and K/P parity CBs may be generated from the systematic CBs. One CB per P OFDM symbol(s) may be mapped into L data transmission OFDM symbol(s). At this time, a size of each CB may be equal to D*P/(L−K). Alternatively, one TB may be segmented into L/P−K systematic CBs, and K parity CBs may be generated from the systematic CBs. One CB per P OFDM symbol(s) may be mapped into L data transmission OFDM symbol(s). At this time, a size of each CB may be equal to D/(L/P−K). At this time, a value of P may be determined as one of values for allowing a size of each CB to be CBsize_min or more and CBsize_max or less.

* If D/(L−K) is greater than CBsize_max, data may be transmitted in the same manner as the method 3. That is, Q>1 CBs may be mapped into one OFDM symbol. At this time, one TB may be segmented into (L−K)*Q systematic CBs, and K*Q parity CBs may be generated from the systematic CBs. Q CBs per one OFDM symbol may be mapped into L data transmission OFDM symbol(s). At this time, a size of each CB may be equal to D/((L−K)*Q). Alternatively, one TB may be segmented into L*Q−K systematic CBs, and K parity CBs may be generated from the systematic CBs. Q CBs per one OFDM symbol may be mapped into L data transmission OFDM symbols. At this time, a size of each CB may be equal to D/(L*Q−K).

Figure 13:
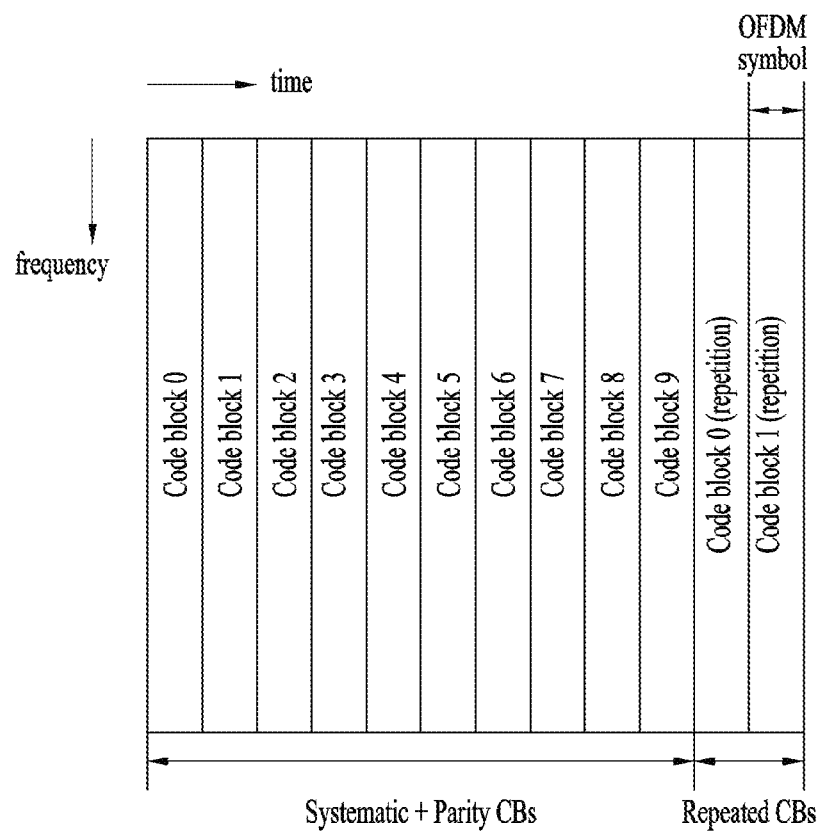
FIG. 13 illustrates another method for mapping code blocks into time symbol(s) in accordance with the present invention.

FIG. 13 illustrates another method for mapping code blocks into time symbol(s) in accordance with the present invention.

The number of OFDM symbols to which data may be transmitted is not fixed and may be varied per transmission of data. For example, the number of OFDM symbols in which data may be transmitted may be varied depending on the number of OFDM symbols of a downlink control region located at a front part of a subframe, the number of OFDM symbols used for transmission of an uplink control channel within a subframe, and a gap time required for downlink to uplink switching. In this case, when the method 1, the method 2 or the method 3 is used, methods for applying an outer code and CB mapping to OFDM symbol are suggested.

If the number of OFDM symbols in which data may be transmitted is not equal to the number of total CBs or is not a multiple/submultiple of the total CBs, insufficient or remaining OFDM symbol region may occur when CB is mapped into OFDM symbol by the method 1, the method 2 or the method 3. For example, although N+K CBs should be mapped into a total of N+K OFDM symbols by the method 1), if the number of OFDM symbols in which data are transmitted is smaller than or greater than N+K, CB cannot be mapped into the data transmission OFDM symbol region properly. Therefore, considering this case, it is suggested that the following methods should be used together with the method 1, the method 2 or the method 3. A plurality of methods of the following methods may be applied together.

* Method a) Different outer codes may be applied depending on the number of OFDM symbols in which data may be transmitted. It is assumed that the information number of outer codes is n and the number of parities is k. That is, it is assumed that the number of systematic CBs input to an outer code is n and the number of parity CBs generated by the outer code is k. At this time, an outer code having a combination of different (n, k) may be used depending on the number of OFDM symbols in which data may be transmitted. That is, according to the method a, the combination of (n, k) used for outer encoding may be changed. For example, if CBs and OFDM symbols are mapped into each other one by one by the method 1, outer codes having a value of n+k equal to the number of data transmission OFDM symbols may be used.

* Method b) The number of parity CBs may be generated differently depending on the number of OFDM symbols in which data may be transmitted. When the information number of outer codes is n and the number of parities is k, outer codes having different values of k may be used depending on the number of OFDM symbols in which data may be transmitted. According to the method a, the combination of (n,k) may be changed depending on the number of OFDM symbols, that is, both n and k may be changed, whereas n is fixed according to the method b. In this case, even though the number of OFDM symbols used for data transmission is changed, the number of CBs prior to outer code encoding is constant. The number of OFDM symbols used for data transmission may be varied depending on subframes. For example, referring to FIG. 3, the number of OFDM symbols used for transmission of PDSCH may be 12, 11 or 10 depending on the amount of control channels. In this case, the minimum number of available data transmission OFDM symbols is 10. Therefore, if CBs and OFDM symbols are mapped into each other one to one by the method 1, the number of CBs prior to application of outer code encoding may be equal to or smaller than the minimum number of available data transmission OFDM symbols. In the case that k parity CBs are generated using an outer code and the case that k+a parity CBs are generated, parity CBs for the case that k parity CBs are generated may be a subset of parity CBs for the case that k+a parity CBs are generated, or not.

* Method c) If the number of OFDM symbols in which data may be transmitted is greater than the number of OFDM symbols into which CBs are mapped, the CB(s) may be transmitted repeatedly, whereby the CBs may be mapped into all OFDM symbol regions on which data may be transmitted. For example, although CBs and OFDM symbols should be mapped into each other one to one by the method 1 in the same manner as the example of FIG. 13, if the number of data transmission OFDM symbols is 12 and greater than 10 which is the number of CBs, some CBs may be repeatedly mapped into two remaining OFDM symbol regions. At this time, the CBs may be repeated in additional OFDM symbol region in due order (in the increasing order of CB index value) from the first CB (that is, CB having a small CB index value). Alternatively, indexes/positions of the CBs transmitted through additional OFDM symbol region may be determined by a specific rule or equation. At this time, the CB(s) repeatedly transmitted through additional OFDM symbol region may be selected from the systematic CBs or the parity CBs.

* Method d) If the number of OFDM symbols in which data may be transmitted is smaller than the number of OFDM symbols into which CBs are mapped, transmission of some CBs may be dropped (e.g., punctured or rate-matched), whereby the CBs may be mapped into the OFDM symbol region in which data may be transmitted. For example, although CBs and OFDM symbols should be mapped into each other one to one by the method 1, if the number of data transmission OFDM symbols is 8 and greater than 10 which is the number of CBs, some CBs may be dropped (e.g., punctured or rate-matched), whereby only 8 CBs may be mapped into the OFDM symbol(s) region. At this time, the CBs which are dropped and failed to be transmitted may be selected in due order (in the increasing order of CB index value) from the first CB (that is, CB having a small CB index value). Alternatively, indexes/positions of the CBs transmitted through additional OFDM symbol region may be determined by a specific rule or equation. At this time, the CB(s) dropped and failed to be transmitted may be selected from the systematic CBs or the parity CBs.

The transmitting device may perform CB mapping to be matched with the amount of a resource into which one CB may be mapped, through rate-matching and/or puncturing after performing channel code encoding (inner code encoding).

* Method i) After channel code encoding is performed for the CBs, the encoded bits may be rate-matched to be matched with the amount of actual resources into which each CB may be mapped.

* Method ii) Alternatively, after channel code encoding is performed for the CBs, the encoded bits may be rate-matched to be matched with the amount of maximum resources into which each CB may be mapped. At this time, the amount of the maximum resources may mean the amount of resources that include a PRB region into which each CB is mapped and all RE regions within an OFDM symbol region. For example, if one CB is mapped into L OFDM symbol regions within P RPBs, the encoded bits may be rate-matched to be matched with the amount of resources for (P*S)*L REs. In this case, S means the number of subcarriers existing in one PRB. At this time, when the CBs which have been subjected to rate-matching are mapped into the resource on which CB is actually transmitted, RE/PRB region which is not used for transmission of data may exist due to transmission of a reference signal (RS) or another channel. In this case, transmission of data may be punctured in the corresponding RE/PRB region.

<C. Outer Code Encoding After Channel Code Encoding>

Meanwhile, outer code encoding may be performed after channel code encoding instead of channel code encoding performed after outer code encoding. If encoding is performed in this way, it is advantageous in that outer code encoding having relatively low complexity is more performed but the number of times of inner code encoding having relatively high complexity may be reduced. In this case, after channel code encoding is performed for each of the systematic CBs, parity CBs may be obtained through outer code encoding from the systematic CBs to which parity bits are attached.

At this time, the number of bits constituting the respective systematic CBs after channel code encoding should be constant to perform outer code encoding.

At this time, the transmitting device may generate data to be transmitted in the order of channel encoding→outer code encoding→rate-matching. In this case, the CBs may be mapped into transmission resources to be matched with the amount of resources, into which each CB may be mapped, by the method i) or ii) of the section B. At this time, channel code encoding of the method i) or ii) may be replaced with outer code encoding.

Alternatively, the transmitting device may generate data to be transmitted in the order of channel encoding→rate-matching→outer code encoding. In this case, if the amount of the rate-matched CBs subjected to channel encoding is not constant, a problem may occur in outer code encoding. To solve this problem, the present invention suggests the following methods.

* After rate-matching CBs channel encoded to be matched with the amount of resources, in which each CB is transmitted, the transmitting device may perform padding of bits (e.g., all-zero bits or all-one bits) known to CBs having a short length in accordance with a size of the longest CB of the respective CBs. Afterwards, outer code encoding may be performed.

* The transmitting device may perform rate-matching for the channel encoded CBs in accordance with the amount of transmission resources of a CB having the largest amount of the transmission resources, or may perform rate-matching for the encoded bits in accordance with the amount of maximum resources into which each CB may be mapped. At this time, for example, the amount of maximum resources may mean the amount of resources that include a PRB region into which each CB is mapped and all RE regions within an OFDM symbol region. For example, if one CB is mapped into L OFDM symbol regions within P PRBs, the encoded bits may be rate-matched with the amount of resources for (P*S)*L REs. At this time, S means the number of subcarriers existing within one PRB. Afterwards, outer code encoding may be performed. When each CB generated as above is mapped into a resource, if RE region in which data cannot be transmitted or a resource to which data are transmitted is not sufficient, it may be transmitted by puncturing or rate-matching data.

Figure 14:
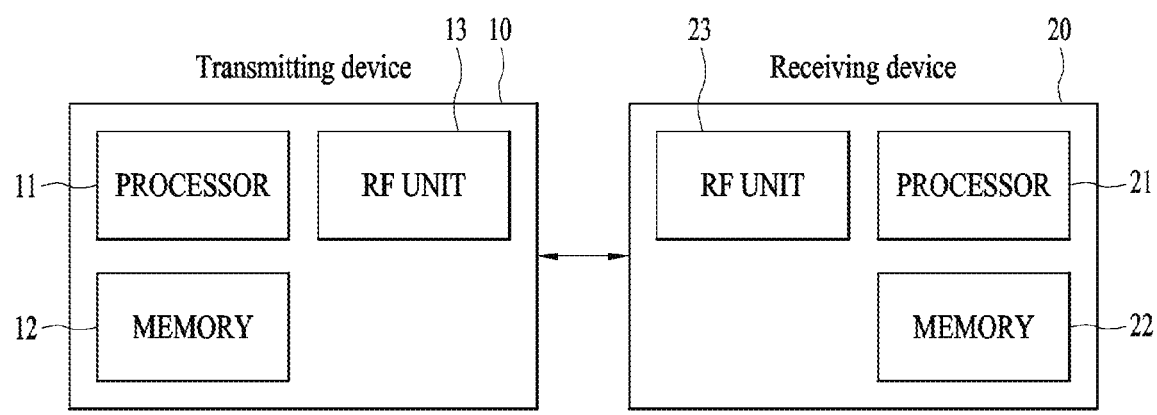
FIG. 14 is a block diagram illustrating elements of a transmitting device 10 and a receiving device 20 for implementing the present invention.

FIG. 14 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described examples of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the examples of the present invention, a UE operates as the transmitting device 10 in UL and as the receiving device 20 in DL. In the examples of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The processor 11 of the transmitting device 10 may generate code blocks (CBs) from a transport block of data in accordance with the present invention, and may map the CBs into a time-frequency resource to which the data are allocated. The processor 11 may map the CBs into a time domain of the time-frequency resource, that is, OFDM symbols to which data are allocated, in accordance with the present invention suggested in the section B. The processor 11 may control the RF unit 13 to transmit the CBs on the time-frequency resource. The processor 11 may acquire the CBs by outer encoding and channel encoding the data in accordance with the present invention described in the section A or C. The processor 11 may generate K parity code blocks by performing outer encoding N parity added systematic CBs obtained by channel encoding for N systematic CBs obtained by segmentation of the transport block. The processor 11 may map the N parity added systematic CBs and N+K CBs corresponding to the K parity code blocks into L OFDM symbols within the time-frequency resource. The processor 11 may map the CBs into the time-frequency resource such that each OFDM symbol within the time-frequency resource includes one or more complete CBs.

The processor 21 of the receiving device 20 may control the RF unit 23 to receive CBs corresponding to data from a time-frequency resource to which the data are allocated. The processor 21 may demap the CBs from the time-frequency resource in accordance with the present invention. The processor 21 may demap the CBs in the time-frequency resource on the assumption that the CBs are mapped into the time-frequency resource in accordance with the present invention suggested in the section B. For example, the processor 21 may demap the CB s from the time-frequency resource on the assumption that each OFDM symbol within the time-frequency resource includes one or more complete CBs. The processor 21 may acquire CBs having no parity bit by performing channel decoding using parity bit(s) included in each of the CBs. The CBs having no parity bit include systematic CBs and parity CBs. If CBs which have been damaged or have an error occur in the systematic CBs of the transport block, the processor 21 may acquire normal systematic CBs by performing outer code decoding using parity CBs of the CBs having no parity bit. The processor 21 may acquire the transport block of the data from the systematic CBs.

As described above, the detailed description of the preferred examples of the present invention has been given to enable those skilled in the art to implement and practice the invention. Although the invention has been described with reference to examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

The examples of the present invention are applicable to a BS, a UE, or other devices in a wireless communication system.

The invention claimed is:
1. A method for transmitting data by a transmitting device, the method comprising:
   generating N systematic code blocks by segmenting a transport block of the data, where N is an integer greater than 1;
   generating N+K code blocks by performing first encoding for generating one or more parity code blocks and performing second encoding for adding parity bits per code block for the N systematic code blocks, where K is a number of parity code blocks;
mapping the N+K code blocks into a time-frequency resource; and
transmitting the N+K code blocks on the time-frequency resource,
wherein the time-frequency resource includes L time symbols in a time domain, where L is an integer greater than 1,
wherein each of the L time symbols includes one or more different code blocks among the N+K code blocks, and
wherein corresponding code block data of each of the N+K code blocks are all mapped in one time symbol.

2. The method of claim 1,
wherein the data are enhanced mobile broadband (eMBB) data.

3. The method of claim 1,
wherein the transport block is segmented into N=L−K systematic code blocks, and the N+K code blocks are respectively mapped into the L time symbols.

4. The method of claim 1, further comprising:
generating N parity added code blocks by performing the second encoding for each of the N systematic code blocks; and
generating K parity code blocks by performing the first encoding for the N parity added code blocks,
wherein the N+K code blocks correspond to a sum of the N parity added code blocks and the K parity code blocks, one to one.

5. The method of claim 1,
wherein an erasure code defined in accordance with a size of L is used for the first encoding.

6. A transmitting device for transmitting data, the transmitting device comprising:
a radio frequency (RF) transmitter; and
a processor configured to control the RF transmitter, wherein the processor is further configured to:
generate N systematic code blocks by segmenting a transport block of the data, where N is an integer greater than 1;
generate N+K code blocks by performing first encoding for generating one or more parity code blocks and performing second encoding for adding parity bits per code block for the N systematic code blocks, where K is a number of parity code blocks;
map the N+K code blocks into a time-frequency resource; and
control the RF transmitter to transmit the N+K code blocks on the time-frequency resource,
wherein the time-frequency resource includes L time symbols in a time domain, where L is an integer greater than 1,
wherein each of the L time symbols includes one or more different code blocks among the N+K code blocks, and
wherein corresponding code block data of each of the N+K code blocks are all mapped in one time symbol.

7. The transmitting device of claim 6,
wherein an erasure code defined in accordance with a size of L is used for the first encoding.

8. The transmitting device of claim 6,
wherein the data are enhanced mobile broadband (eMBB) data.

9. The transmitting device of claim 6,
wherein the processor segments the transport block into N=L−K systematic code blocks, and respectively maps the N+K code blocks into the L time symbols.

10. The transmitting device of claim 6,
wherein the processor generates N parity added code blocks by performing the second encoding for each of the N systematic code blocks, and generates K parity code blocks by performing the first encoding for the N parity added code blocks, wherein the N+K code blocks correspond to a sum of the N parity added code blocks and the K parity code blocks, one to one.

11. A method for receiving data by a receiving device, the method comprising:
receiving a plurality of code blocks mapped in a time-frequency resource allocated to the data; and
recovering the data from the plurality of code blocks,
wherein recovering the data comprises:
acquiring N systematic code blocks by performing first decoding for recovering code blocks using parity code blocks and performing second decoding for recovering code blocks using parity bits per code block for N+K parity added code blocks corresponding to the plurality of code blocks; and
acquiring a transport block of the data from the N systematic code blocks, where K is a number of parity code blocks and N is an integer greater than 1,
wherein the time-frequency resource includes L time symbols in a time domain, where L is an integer greater than 1,
wherein each of the L time symbols includes one or more different code blocks among the plurality of code blocks, and
wherein corresponding code block data of each of the plurality of code blocks are all received in one time symbol.

12. The method of claim 11,
wherein the second decoding includes acquiring N+K parity removal code blocks using parity bits of each of the N+K parity added code blocks, and the first decoding includes acquiring the N systematic code blocks using K parity code blocks among the N+K parity removal code blocks.

13. The method of claim 11,
wherein N=L−K, and the N+K parity added code blocks are respectively received in the L time symbols.

14. A receiving device for receiving data, the receiving device comprising:
a radio frequency (RF) receiver; and
a processor configured to control the RF receiver, wherein the processor is further configured to:
control the RF receiver to receive a plurality of code blocks mapped in a time-frequency resource allocated to the data; and
recover the data from the plurality of code blocks,
wherein the time-frequency resource includes L time symbols in a time domain, where L is an integer greater than 1,
wherein each of the L time symbols includes one or more different code blocks among the plurality of code blocks,
wherein corresponding code block data of each of the plurality of code blocks are all received in one time symbol, and
wherein the processor is further configured to acquire N systematic code blocks by performing first decoding for recovering code blocks using parity code blocks and performing second decoding for recovering code blocks using parity bits per code block for N+K parity added code blocks corresponding to the plurality of code blocks, and acquire a transport block of the data from the N systematic code blocks, where K is a number of parity code blocks and N is an integer greater than 1.

15. The receiving device of claim 14,
wherein the processor performs the second decoding using an erasure code defined in accordance with a size of L.

16. The receiving device of claim 14,
wherein N=L−K, and the N+K parity added code blocks are respectively received in the L time symbols.

* * * * *